United States Patent Office 3,057,842
Patented Oct. 9, 1962

3,057,842
AlCl₃-CATALYZED POLYMERIZATION OF ETHYLENE
John D. Calfee, Dayton, Ohio, assignor to Monsanto Chemical Company, St. Louis, Mo., a corporation of Delaware
No Drawing. Filed Mar. 17, 1958, Ser. No. 721,675
5 Claims. (Cl. 260—94.9)

This invention relates to the production of high molecular weight polymers of ethylene and to the preparation of these polymers in the presence of a finely divided solid aluminum chloride catalyst.

An object of this invention is to provide a useful form of a highly-active catalyst for the preparation of high molecular weight solid polymer from ethylene. The catalyst of this invention is effective in polymerizing ethylene whether present alone or as a constituent of a gas mixture.

Another object of this invention is to obtain a novel process for the polymerization to ethylene to high molecular weight solid polymer. My invention may be practiced at comparatively low to moderate pressures and is particularly effective at relatively low temperatures.

Generally, Friedel-Crafts type catalysts have not been effective for converting ethylene to solid polymers but instead have resulted in the formation of liquid polymers from ethylene; however, it has been reported that solid polymers admixed with oils can be obtained by polymerizing ethylene in the presence of aluminum chloride and titanium chloride at elevated temperatures and pressures and advantageously in the presence of HCl-binding metals like aluminum powder (German Patent No. 874,215).

The practice of my invention will give solid polyethylene polymer without the use of a co-catalyst, and operates successfully at low to moderate pressure and low temperature.

It is well known that aluminum chloride is very active as a polymerization catalyst for ethylene at moderate temperatures and pressures. However, under polymerizing conditions aluminum chloride catalyzes the hydrogenation-dehydrogenation of aliphatic hydrocarbons. As a result, both polymerization and hydrogen disproportionation occur. Polymer olefins, as such or at the moment of formation, are subject to cyclization, intramolecular alkylation, and isomerization. The over-all phenomenon (polymerization conjoined with hydrogen disproportionation) is recognized as "conjunct polymerization," and has been described by Ipatieff and Grosse in the Journal of the American Chemical Society, vol. 58, page 915 (1936).

An object of this invention is to modify aluminum chloride to obtain a material retaining the excellent activity of AlCl₃ as a polymerization catalyst while suppressing or considerably reducing the activity of aluminum chloride as a catalyst for conjunct polymerization.

Early workers in this field demonstrated that conjunct polymerization could be controlled to a certain extent by reduction of temperature during reaction. H. I. Waterman and J. J. Leendentse studied olefin polymerization and reported in the Journal of the Institution of Petroleum Technologists, vol. 34, page 16 (1938) that when polymerizing ethylene at 125–150° C. with aluminum chloride catalyst under increased pressure considerable cyclization occurred. These investigators further reported that ethylene reacts very slowly at about room temperature and atmospheric pressure using aluminum chloride catalyst, but cyclization was found to occur at temperatures as low as −78° C.

Experimental evidence (U. S. 1,745,028) has been published to show that polymerization of ethylene can be carried out by passing gaseous ethylene through a suspension of aluminum chloride, dispersed in a hydrocarbon diluent. Only liquid products, i.e., low molecular weight polymers, were prepared by this procedure. The difficulties inherent in the method are apparent in that undesirable side reactions occur at normal operating temperatures, while at low temperatures the polymerization is too slow to have practical interest for the preparation of high molecular weight solid polymer from ethylene.

Attempts have been made to avoid "conjunct polymerization" by the use of solvents for the olefin polymerization catalyst. Investigators have shown that at low temperatures the reaction of ethylene to produce polymerization products in the presence of solvents gave only low molecular weight oils. The reaction is characterized by a long reaction time, and sludge or catalyst complex formation.

While references have been found teaching the use of aluminum chloride catalysis to polymerize ethylene to low molecular weight oils, the use of the finely divided, crystallite aluminum chloride of my invention has given solid high molecular weight polyethylene having extensive applications and utility in the plastics industry. Polyethylene produced by my invention can be molded to form useful articles or processed to transparent film for use in the packing industry for example.

I have now found that finely divided aluminum chloride prepared by slow precipitation of AlCl₃ from solution by the addition of a non-solvent has great, and unexpected, activity as a catalyst for polymerizing ethylene to solid, high molecular weight polymer. Effective, finely divided catalyst has also been prepared by passing a solution of AlCl₃ in an inert volatile solvent through an orifice. Sudden release of pressure results in formation of a very fine spray or mist. Evaporation of the solvent from the mist thereby forms a finely divided AlCl₃.

Precipitation of aluminum chloride from solution by the slow addition of an inert non-solvent has given particles so finely divided that turbidity is the only apparent change taking place. The particles of aluminum chloride settle very slowly from the suspension. These particles when examined under a high-powered optical microscope appear non-crystalline or amorphous. However, X-ray diffraction technique shows the presence of extremely small, submicroscopic crystals, known as "crystallites." These crystallites have been measured by the technique of X-ray diffraction line broadening and by electron microscopy. The crystallites of aluminum chloride prepared for use in polymerizing ethylene to high molecular weight solid polymer, in accordance with this invention, range in size downward from about 2 microns to about 0.01 micron in diameter.

In the reference book "Anhydrous Aluminum Chloride in Organic Chemistry" page 867, Dr. Charles A. Thomas writes:

"Since the activity of a catalyst increases as its surface is increased, finely powdered AlCl₃ is more useful in many reactions than is coarsely ground or lump AlCl₃. The use of the finely powdered catalyst, however, often results in a rapid reaction which may be undesirable in condensations effected with sensitive materials or with very active compounds."

I have demonstrated that merely grinding AlCl₃ to a fine state is insufficient to prepare an active catalyst to polymerize ethylene to a solid polymer. A critical state of subdivision is necessary, thus AlCl₃ of crystallite diameter below 2 microns must be achieved in order to catalyze the ethylene polymerization to high molecular weight solid polymer.

In the polymerization of ethylene according to my invention an inert diluent can be advantageously employed. There is a tendency for the product solid polymer to build up on the surface of the catalyst under certain conditions. An organic liquid has been found useful in dispersing the polymer thus increasing catalyst lift. Furthermore, these liquids can be used to prevent deposits of solid polymer on the reactor walls and on the mechanical stirrer. Diluents particularly suitable in this reaction are the lower molecular weight saturated aliphatic hydrocarbons, e.g., ethane, propane, butanes, pentanes, hexanes, heptanes, octanes, etc. The lower boiling materials are used under polymerization conditions of low temperature and pressure such that they are liquid.

The ethylene feed stock can also be diluted with one or more of the lower molecular weight aliphatic hydrocarbons or with nitrogen to modify the temperature or rate of reaction if desired.

The polymerization reaction is preferably carried out at low temperatures; however, solid polyethylene can be produced beyond the range from −100° C. to +80° C. I prefer to operate in the range from −78° C. to +50° C., for convenience in maintaining the reaction temperature.

The process may be carried out continuously or on a batchwise basis if desired. Pressure during the polymerization is not a critical factor as the reaction proceeds readily at atmospheric pressure. For convenience in handling ethylene it may be desirable to operate at superatmospheric pressure, say at about 2000 p.s.i. or less.

The following examples are given to illustrate the practice of my invention, with particular reference to preferred embodiments thereof. It will be appreciated that variations in temperature, pressure, ratio of reactants, etc., can be effected without departing from the invention in its broadest aspects.

*Example 1*

A sock solution of aluminum chloride was prepared for use in these examples by boiling a solvent (methyl chloride or ethyl chloride) with a large excess of crushed aluminum chloride for fifteen minutes to insure saturation. The mixture was then filtered through filter paper. The clear filtrate was stored in a sealed flask immersed in Dry Ice until ready for use. No AlCl₃ precipitated from the saturated solution when it was cooled to the low temperature.

Methyl chloride and ethyl chloride are preferred as solvents because they dissolve aluminum chloride without giving complex formation. Solubility of AlCl₃ in these solvents is limited, however, amounting to about 1 percent by weight in methyl chloride and about 5 percent by weight in ethyl chloride.

*Example 2*

A glass reactor, cooled to −78° C., was charged with 25 ml. of the catalyst from Example 1, namely with a 5 percent aluminum chloride solution in ethyl chloride. The catalyst solution was saturated with ethylene by bubbling the gas through the liquid as the temperature was maintained at −78° C. The solution remained clear and there was no separation of an oil or solid phase after several hours.

The catalyst was quenched with alcohol, and water added. After the ethyl chloride was vaporized no trace of polymer was observed in the aqueous solution that remained.

*Example 3*

A 1 percent solution of aluminum chloride in methyl chloride prepared according to the procedure of Example 1, was charged to a glass reactor maintained at −78° C. at atmospheric pressure. A quantity of cold butane was then rapidly added precipitating the aluminum chloride as an agglomerate. Ethylene was bubbled through the reactor at −78° C. After about one hour the catalyst was coated with oil, a polymer of comparatively low molecular weight.

*Example 4*

A 5 percent solution of aluminum chloride in ethyl chloride standing over crushed aluminum chloride powder obtained by mechanically grinding was saturated with ethylene at −78° C. and allowed to stand for 36 hours at −78° C. There was essentially no polymer formation as no polymer was received by quenching the catalyst with isobutanol and steam distilling off the butanol from an aqueous solution. This example shows that ordinary physical processes of preparing powders (crushing, grinding, etc.) will not give an active aluminum chloride catalyst suitable for preparing solid ethylene polymer.

*Example 5*

Catalyst solution prepared according to Example 1, namely a 1 percent solution of aluminum chloride in methyl chloride, was added to a glass reactor cooled at −78° C. at atmospheric pressure. While the solution was being vigorously agitated, liquid butane was added at a dropwise rate. Since butane is a non-solvent for aluminum chloride, this catalyst was precipitated in a finely divided form. The aluminum chloride particles appeared as a fog, or turbidity in the liquid and tended to remain dispersed when agitation was stopped. Crystallite diameter of this solid catalyst was determined to be less than 2 microns by electron miscroscopy. Ethylene was passed through the dispersion and within one hour the catalyst was coated with solid polyethylene.

*Example 6*

A thin-walled steel autoclave was equipped with a needle valve providing a small diameter orifice. The autoclave was charged with 3 grams anhydrous aluminum chloride, sealed, and evacuated. An addition of 300 grams anhydrous methyl chloride was then made to this autoclave. This system was operated as a type of "aerosol bomb" by opening the needle valve with the bomb inverted so that the solution of aluminum chloride catalyst was adjacent to the valve, whereup, a mist was ejected and with the rapid evaporation of the methyl chloride, a very fine powdery aluminum chloride was obtained. Catalyst prepared by this technique had crystallite diameters in the range of 2 microns to about 0.01 micron when determined by the technique of X-ray diffraction line broadening.

*Example 7*

Into a quanity of dry hexane was sprayed aluminum chloride powder by the use of the "aerosol bomb" technique of Example 6. The solvent, methyl chloride, vaporized instantly into the atmosphere, and a very fine dispersion of aluminum chloride in hexane was obtained. Ethylene was bubbled through this dispersion at atmospheric pressure and room temperature. The quantity of waxy polyethylene polymer which formed was isolated by quenching the catalyst with isobutanol adding water and stripping off the hexane and isobutanol by steam distillation, and recovering the solid ethylene polymer from the water.

*Example 8*

The interior walls of a 1-liter glass reactor were coated with very finely divided anhydrous aluminum chloride by the aerosol technique and apparatus of Example 6. The reactor was evacuated and was then charged with ethylene gas to atmospheric pressure. The system was connected to a mercury manometer to provide a means of following ethylene polymerization, as as reduction in pressure within the closed system would indicate ethylene polymerization. During a period of 16 hours at room temperature the pressure fell steadily to about 200 mm. mercury, and a thin layer of solid polyethylene had deposited on the finely divided aluminum chloride.

Example 9

A catalyst solution prepared according to the procedure of Example 1, consisting of 50 ml. of 5 percent aluminum chloride in ethyl chloride, was slowly diluted with 150 ml. liquid propane in a reactor cooled to −78° C. A finely divided precipitate of aluminum chloride, observable only as turbidity in the liquid was formed. The average diameter of these crystallites was determined to be less than 1 micron by electron microscopy. The suspension was saturated with ethylene and ethylene was supplied continuously as the polymerization reaction proceeded. Within about 30 minutes a precipitate had settled which was separated by decantation of the supernatant liquid. The catalyst was removed from the product by washing with boiling water and a solid ethylene polymer recovered.

Example 10

A 1000-ml. cylindrical autoclave was charged with 100 ml. of a 1 percent solution of aluminum chloride in methyl chloride prepared according to the procedure of Example 1. The autoclave was cooled to −78° C. by immersion in a cooling bath. While the autoclave was maintained at −78° C. 150 g. of ethylene was charged intermittently over a period of about 15 minutes. The slow addition of ethylene precipitated the $AlCl_3$ from solution as crystallites. As soon as the ethylene had been completely charged, the autoclave was immediately removed from the bath and vented without warming. A solid product had formed within the reactor. This product-catalyst mixture was washed with isobutanol and the resulting slurry poured into water. The isobutanol was stripped off by steam distillation and a hard, waxy polymeric product, polyethylene, recovered from the water.

The examples described herein are illustrative of the nature of the basic problem and the unique solution thereof. My object has been to modify aluminum chloride so that it would promote and catalyze ethylene polymerization, and to adjust reaction conditions, to obtain solid, high molecular weight polyethylene without obtaining side-reaction products, i.e., low molecular weight liquid polyethylenes.

Example 2 confirms the work of other investigators who have reported little or no catalytic activity of aluminum chloride in the polymerization of ethylene at −78° C. It has been reported by other investigators in this field that ethylene may be used as an inert solvent for the polymerization of iso-olefins with aluminum chloride catalysis at or below −78° C. U.S. 2,800,465 teaches the use of ethylene as an inert solvent or diluent for polymerizing isobutylene with an active halide catalyst such as aluminum chloride.

Examples 3 and 4 prove that crystalline aluminum chloride of high surface area, prepared by crushing commercial aluminum chloride powder, or by rapidly precipitating the catalyst from solution, catalyzed conjunct polymerization. These procedures give only low molecular weight oils with no solid high molecular weight polymer.

Example 5 shows the preparation of aluminum chloride of crystallite structure and the unexpected high activity of this catalyst for polymerizing ethylene to solid polymer at −78° C. The reaction occurred rapidly and could be followed visually. Within a few minutes after addition of ethylene, the catalyst particles became coated with polymer, coagulation occurred followed by settling. The polymer obtained after a simple isolation step was a crystalline wax, entirely different from that made at high temperature by conjunct polymerization.

When the results of the demonstrations of Examples 3 and 4 are compared with Example 5, the effect of catalyst particle size is emphasized. In Examples 3 and 4 conjunct polymerization predominates if the aluminum chloride is used as comparatively coarse aggregates and the polymer that forms is a low molecular weight oil. In Example 5, however, with heterogeneous catalysis but with aluminum chloride of crystallite particle diameter of less than about 2 microns high molecular weight solid polyethylene is produced. Therefore, conditions of low reaction temperature, and catalyst particle size of less than about 2 microns diameter are necessary to suppress conjunct polymerization.

Examples 6 to 8 illustrate the preparation of fine particle size active catalyst by the use of an aerosol spray technique. The catalyst prepared by atomizing a solution of aluminum chloride in volatile solvent has the necessary crystallite size and is effective in polymerizing ethylene to solid high molecular weight polymer. An inert diluent can be used if desired.

Examples 9 and 10 illustrate the use of inert diluents for the preparation of solid high molecular weight polymer from fine particle size aluminum chloride at low temperatures. The diluent, when used with agitation by mechanical means, is useful in preventing build-up of polymer on the catalyst surface. However, it has been demonstrated that in particular instances the finely divided aluminum chloride may be used without a diluent or dispersant for the system, for example, a continuous polymerization system is an embodiment of this invention whereby ethylene is passed in contact with a fluidized bed of crystallite, anhydrous aluminum chloride.

The nature and objects of the present invention having been thus fully set forth and specific examples of the same given, what is claimed as new and useful and desired to be secured by Letters Patent is:

What is claimed is:

1. In the process for polymerizing ethylene to high molecular weight solid polymer, the improvement which comprises employing a catalyst consisting essentially of aluminum chloride having a crystallite diameter of less than about 2 microns.

2. In the process for polymerizing ethylene to high molecular weight solid polymer, the improvement which comprises employing a catalyst consisting essentially of aluminum chloride having a crystallite diameter of less than about 2 microns at a reaction temperature between about −100° C. and +80° C.

3. The process of polymerizing ethylene to high molecular weight solid polymer which comprises contacting ethylene with a catalyst consisting essentially of aluminum chloride having a crystallite diameter of less than about 2 microns in the presence of an inert diluent at a reaction temperature between about −100° C. and +80° C. and separating polyethylene therefrom.

4. The process of polymerizing ethylene to high molecular weight solid polymer which comprises contacting ethylene with a catalyst consisting of aluminum chloride having a crystallite diameter of less than about 2 microns in the presence of an inert diluent and separating polyethylene therefrom.

5. The process of polymerizing ethylene to high molecular weight solid polymer which comprises contacting ethylene with a catalyst consisting of aluminum chloride having a crystallite diameter of less than about 1 micron in the presence of an inert diluent at a reaction temperature between about −78° C. and +50° C. and separating polyethylene therefrom.

References Cited in the file of this patent

UNITED STATES PATENTS

| 1,701,510 | Sieurin | Feb. 12, 1929 |

FOREIGN PATENTS

| 874,215 | Germany | Apr. 20, 1953 |
| 1,007,999 | Germany | May 9, 1957 |